(12) United States Patent
Kinjo et al.

(10) Patent No.: US 6,944,684 B1
(45) Date of Patent: Sep. 13, 2005

(54) SYSTEM FOR SELECTIVELY USING DIFFERENT COMMUNICATION PATHS TO TRANSFER DATA BETWEEN CONTROLLERS IN A DISK ARRAY IN ACCORDANCE WITH DATA TRANSFER SIZE

(75) Inventors: Morishige Kinjo, Tama (JP); Masayuki Takakuwa, Fuchu (JP); Susumu Hirofuji, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 743 days.

(21) Appl. No.: 09/628,306

(22) Filed: Jul. 28, 2000

(30) Foreign Application Priority Data

Jul. 29, 1999 (JP) .......................................... 11-215348

(51) Int. Cl.[7] .............................................. G06F 13/14
(52) U.S. Cl. .......................................... 710/31; 710/38
(58) Field of Search ............................ 710/31, 38, 37, 710/307, 33; 711/114, 113, 150, 171, 168, 112, 123, 165; 714/3, 6

(56) References Cited

U.S. PATENT DOCUMENTS

| | | | | |
|---|---|---|---|---|
| 5,768,623 A | * | 6/1998 | Judd et al. .................... | 710/37 |
| 6,073,218 A | * | 6/2000 | DeKoning et al. .......... | 711/150 |
| 6,101,574 A | * | 8/2000 | Kumasawa et al. ......... | 711/113 |
| 6,145,028 A | * | 11/2000 | Shank et al. .................. | 710/31 |
| 6,289,389 B1 | * | 9/2001 | Kikinis ........................ | 709/239 |
| 6,393,519 B1 | * | 5/2002 | Fujimoto et al. ........... | 711/113 |
| 6,535,954 B2 | * | 3/2003 | Obara et al. ................. | 711/114 |

* cited by examiner

*Primary Examiner*—Le Hien Luu
(74) *Attorney, Agent, or Firm*—Finnegan, Henderson, Farabow, Garrett & Dunner, L.L.P.

(57) ABSTRACT

An information communication system for performing information communication between a first system and a second system is disclosed. The communication system includes a first communication path that is used for information communication when a transfer size between the first system and the second system is smaller than a predetermined size and is capable of high-speed response, and a second communication path that is used for information communication when the transfer size between the first system and the second system is larger than the predetermined size and has a larger transfer capability than that of the first communication path. Each of the first and second systems comprises main control means for selectively using one of the first and second communication paths in accordance with a size of information subjected to information communication with a counterpart system.

8 Claims, 6 Drawing Sheets

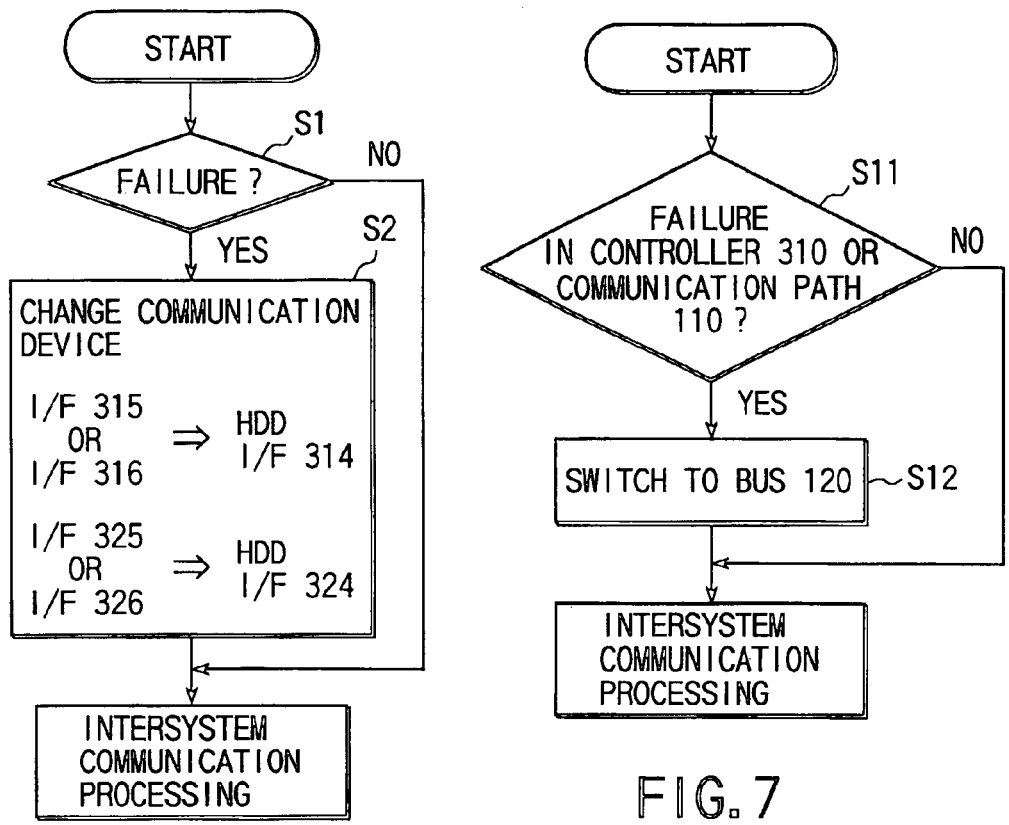
FIG. 6
FIG. 7
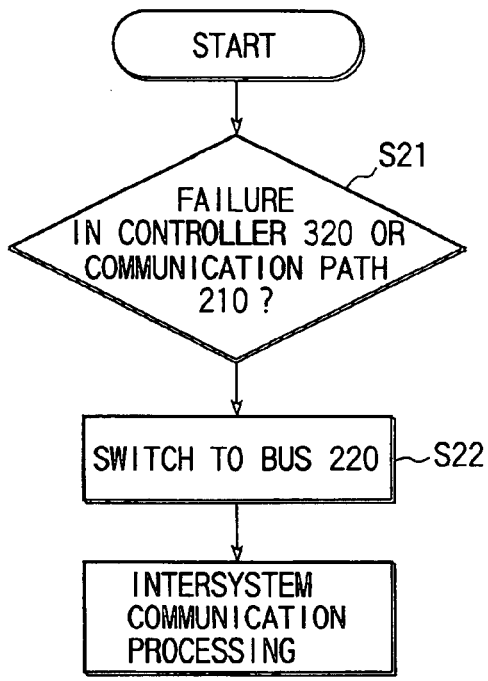
FIG. 8

SYSTEM FOR SELECTIVELY USING DIFFERENT COMMUNICATION PATHS TO TRANSFER DATA BETWEEN CONTROLLERS IN A DISK ARRAY IN ACCORDANCE WITH DATA TRANSFER SIZE

CROSS-REFERENCE TO RELATED APPLICATIONS

This application is based upon and claims the benefit of priority from the prior Japanese Patent Application No. 11-215348, filed Jul. 29, 1999, the entire contents of which are incorporated herein by reference.

BACKGROUND OF THE INVENTION

The present invention relates to an information communication system represented by a duplex controller incorporating apparatus having a duplex controller to perform information communication between the first system and the second system.

Some recent disk array apparatuses construct a duplex controller incorporating apparatus having a duplex controller whose respective controllers can be connected to different host apparatuses. In a disk array apparatus of this type, data can be transferred between each controller (each system) and a corresponding host apparatus. Each controller has a cache memory for temporarily storing transfer data to the host apparatus.

Conventionally, a disk array apparatus (information communication system) having the above-described duplex controller employs a so-called mirrored cache scheme to increase the integrity of data on the cache memory in each controller (each system). In this scheme, write data received from the host apparatus by (the controller in) the self system is copied (mirrored) in the cache memory of the controller of the counterpart system.

In the disk array apparatus using this mirrored cache scheme, generally, after copy (write) in the cache memory of the counterpart system is completed, i.e., after the contents of the cache memory of the self system match those of the cache memory of the counterpart system, the host apparatus is notified of completion of the write.

Additionally, the disk array apparatus of this type generally has a special redundant path to improve reliability in important communication between the controllers.

As described above, in the conventional disk array apparatus (duplex controller incorporating apparatus or information communication system) having a duplex controller and using the mirrored cache scheme, the controller of the self system cannot return a completion message to the host side until the write in the counterpart system is ended, the write data communication path between the controllers becomes a bottleneck for write performance.

In addition, the conventional disk array apparatus (duplex controller incorporating apparatus or information communication system) must have a special redundant path to improve reliability in important communication between the controllers.

BRIEF SUMMARY OF THE INVENTION

The present invention has been made in consideration of the above situation, and has as its object to provide an information communication system which selectively uses a communication path for information communication between two systems, which is represented by information communication between the respective controllers of a duplex controller, depending on the difference in transfer size, thereby enabling high-speed information communication between the systems.

It is another object of the present invention to provide an information communication system capable of making a path redundant without preparing a special redundant path.

According to an aspect of the present invention, there is provided an information communication system for performing information communication between a first system and a second system, comprising a first communication path which is used for information communication when a transfer size between the first system and the second system is smaller than a predetermined size and is capable of high-speed response when the transfer size is smaller than the predetermined size, and a second communication path which is used for information communication when the transfer size between the first system and the second system is larger than the predetermined size and has a larger transfer capability than that of the first communication path when the transfer size is larger than the predetermined size, wherein each of the first and second systems comprises main control means for controlling to selectively use one of the first and second communication paths in accordance with a size of information subjected to information communication with a counterpart system.

In this arrangement, when information communication is to be performed between the two systems, the communication path is selectively used in accordance with the size (transfer size) of information subjected to the information communication. More specifically, when the transfer size is small, the first communication path capable of high-speed response when the transfer size is small is used, and when the transfer size is large, the second communication path having a large transfer capability is used, thereby enabling high-speed information communication between the two systems. Since the transfer size is often determined by the type of information communication, the cache memory is selectively used in accordance with the type (e.g., whether the information communication is communication included in a series of procedures before and after data transfer, which are necessary for data transfer, i.e., control data communication, or data transfer itself).

In an arrangement in which each of the first and second systems comprises an internal bus connected to the main control means (e.g., microprocessor unit), each of the first and second systems is equipped with first interface control means for sequentially performing information communication with the counterpart system through the first communication path under the control of the main control means in the self system through the internal bus, and second interface control means for performing instructed information communication with the counterpart system through the second communication path independently of the main control means in accordance with an instruction from the main control means in the self system. This enables efficient information communication (information transfer) by selectively using the communication path to be used in accordance with the transfer size.

In an arrangement in which the first and second systems comprise a duplex controller whose each controller incorporates a cache memory using a mirrored cache scheme, the second interface control means is made to have a function of causing the second interface control means in the counterpart system to copy data stored in the cache memory in the self system to the cache memory in the counterpart system through the second communication path in accordance with an instruction from the main control means in the self system. This realizes copy of a large quantity of data while preventing an increase in traffic in the internal bus.

In a system comprising at least one disk apparatus commonly accessible from the first and second systems, and a third communication path for connecting the first and second systems to the disk apparatus, when a failure occurs on the first path or second path, the third communication path for an access to the disk apparatus is used as an alternative path of the first or second path under the control of the main control means. This makes the communication path redundant without preparing any special redundant path.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a flow chart for explaining a change in communication device;

FIG. 7 is a flow chart for explaining controller switching in a host apparatus 100; and FIG. 8 is a flow chart for explaining controller switching in a host apparatus 200.

DETAILED DESCRIPTION OF THE INVENTION

A case wherein an information communication system is constructed by a disk array apparatus incorporating a duplex controller according to an embodiment of the present invention will be described below with reference to the accompanying drawing.

Figure 1:
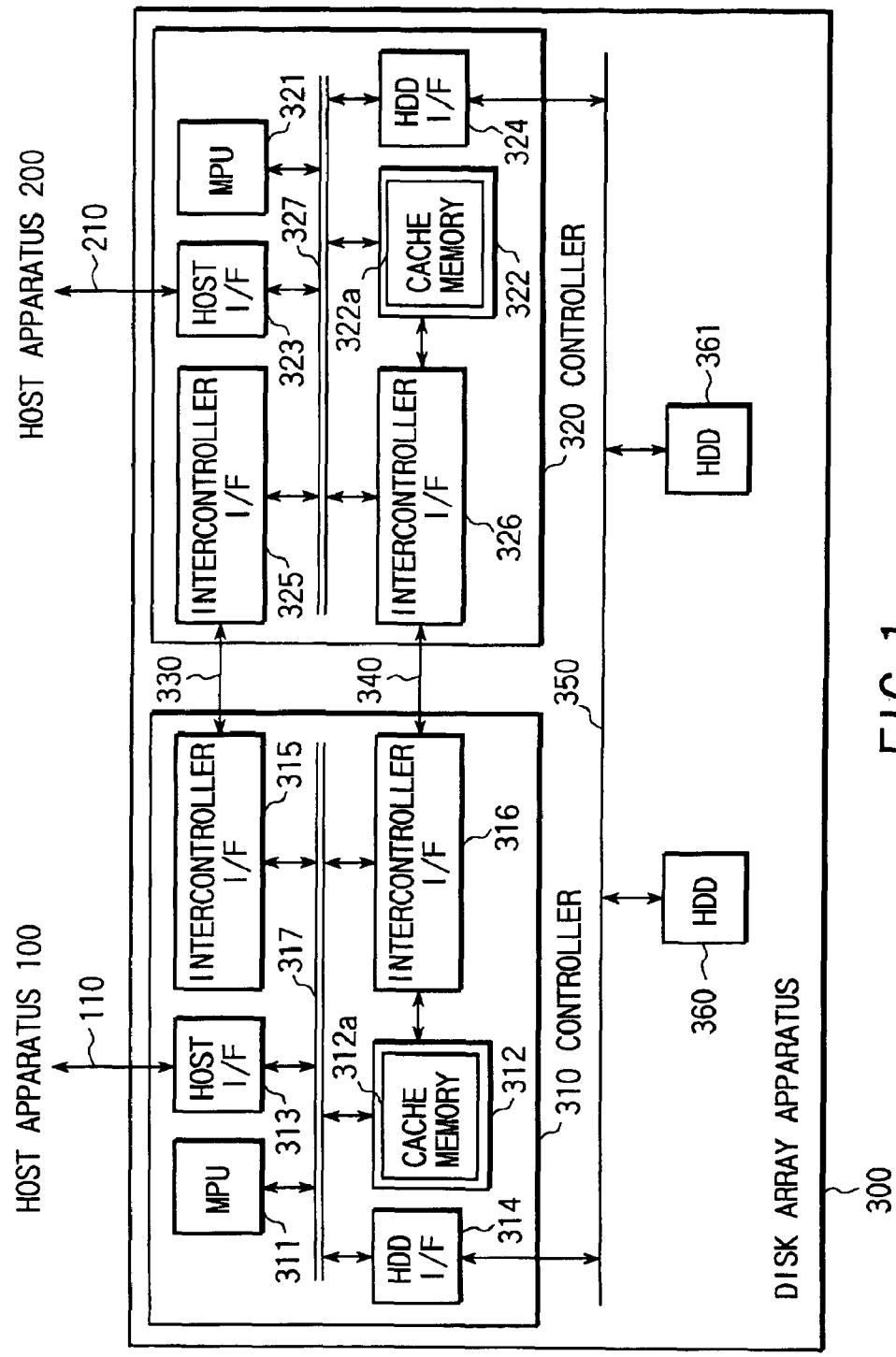
FIG. 1 is a block diagram of a disk array apparatus incorporating a duplex controller according to an embodiment of the present invention.
Figure 2:
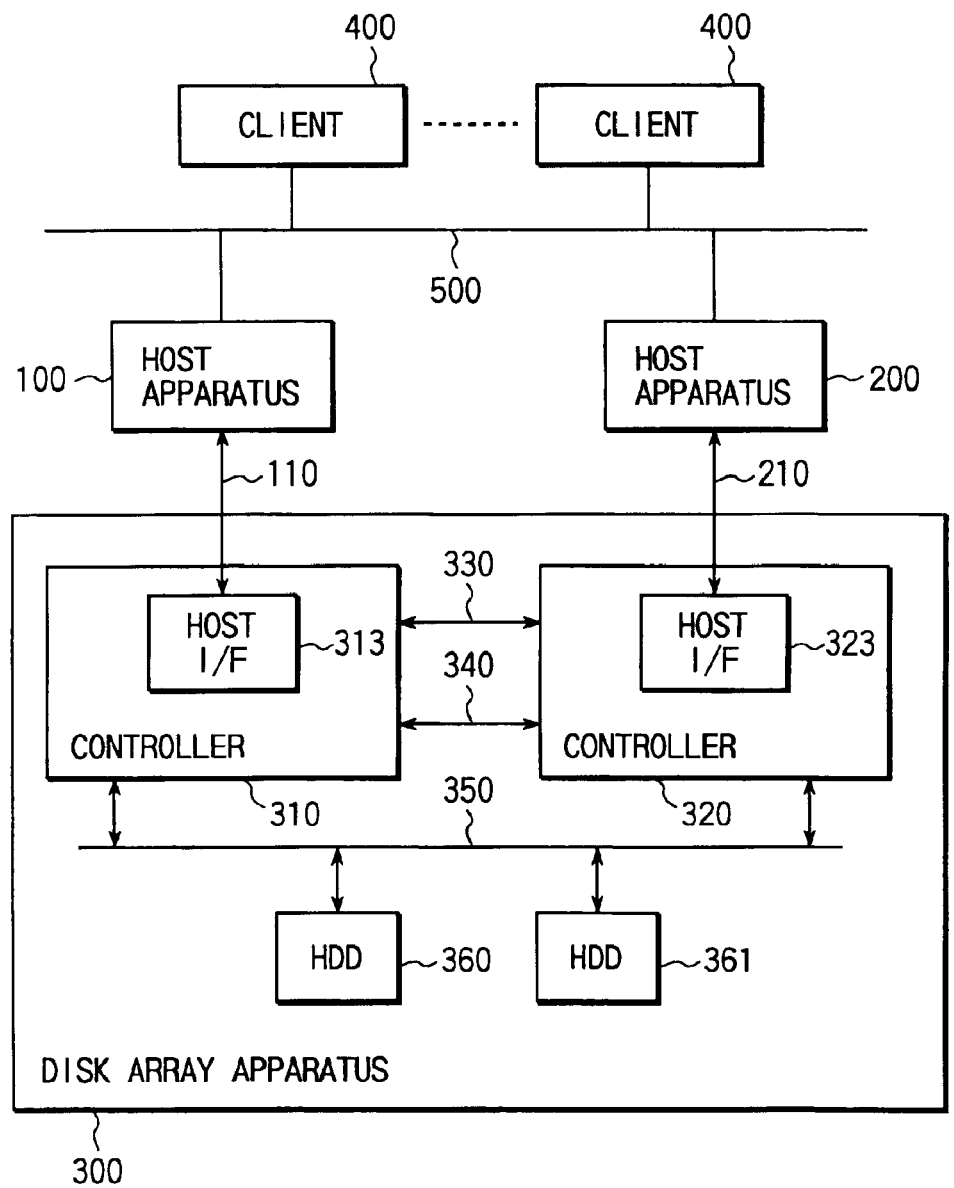
FIG. 2 is a block diagram of a system having the disk array apparatus with the arrangement shown in FIG. 1.

FIG. 1 is a block diagram of the disk array apparatus incorporating a duplex controller according to an embodiment of the present invention. FIG. 2 is a block diagram of a system having the disk array apparatus.

Referring to FIG. 2, reference numerals 100 and 200 denote host apparatuses (host, computers) connected to a disk array apparatus directly related to the present invention, and serving as, e.g., servers (server computers). The host apparatuses 100 and 200 and a disk array apparatus 300 (host I/Fs 313 and 323 provided in controllers 310 and 320 (to be described later) in the disk array apparatus 300) are connected through buses 110 and 210 such as SCSI (Small Computer System Interface) buses or fiber channel buses.

A plurality of clients (client computers) 400 are connected to the host apparatuses 100 and 200 through a network 500 constructed by an Ethernet bus, ring bus, or the like.

As shown in FIG. 1, the disk array apparatus 300 has the controllers 310 and 320 constructing a duplex controller to control the entire disk array apparatus 300 and a plurality of disk devices forming a disk array, e.g., two hard disk devices 360 and 361 (to be referred to as HDDs hereinafter). The controllers 310 and 320 (HDD-I/Fs 314 and 324 in the controllers 310 and 320) and the HDDs 360 and 361 are connected through a bus 350 such as a SCSI bus.

The controllers 310 and 320 have MPUs (Micro Processing Units) 311 and 321 serving as central control sections or control centers of the controllers 310 and 320, and cache memory sections 312 and 322, respectively.

The cache memory sections 312 and 322 incorporate cache memories 312a and 322a for temporarily storing data (write data) transferred from the host apparatuses 100 and 200 or data (read data) read out from the HDDs 360 and 361, respectively.

The cache memories 312a and 322a have areas where data from the counterpart controllers 320 and 310 paired with the controllers 310 and 320 having (the cache memory sections 312 and 322 incorporating) the cache memories 322a and 312a, i.e., data from the counterpart controllers 320 and 310 (counterpart systems) can be copied, respectively.

Each of the cache memory sections 312 and 322 has, as interfaces, two ports for connection to a corresponding one of internal buses 317 and 327 (to be described later) and for intercontroller data transfer (for connection to a bus 340 used for intercontroller data transfer).

The controllers. 310 and 320 also have interface sections serving as control sections for the buses 110 and 210 connected to the host apparatuses 100 and 200, i.e., the interface control sections (to be referred to as host I/Fs hereinafter) 313 and 323 to the host apparatuses 100 and 200, and the interface control sections (to be referred to as HDD-I/Fs hereinafter) 314 and 324 to the HDDs 360 and 361, respectively.

The controllers 310 and 320 also have intercontroller data transfer control sections (to be referred to as intercontroller I/Fs hereinafter) 315 and 325 which control data transfer between the controllers 310 and 320 and are capable of high-speed response when the data transfer size is small, and intercontroller data transfer control sections (to be referred to as intercontroller I/Fs hereinafter) 316 and 326 which control data transfer between the controllers 310 and 320 and are capable of predetermined response independently of the data transfer size, respectively.

The intercontroller I/Fs 315 and 325 are connected to the MPUs 311 and 321 through the internal buses 317 and 327, respectively. The intercontroller I/Fs 316 and 326 are connected to the intercontroller data transfer ports of the cache memory sections 312 and 322, respectively.

The controllers 310 and 320 also have the internal buses 317 and 327 represented by PCI buses (Peripheral Component Interconnect Buses), respectively. The internal buses 317 and 327 are connected to the modules (in this case, the MPUs 311 and 321, cache memory sections 312 and 322, host I/Fs 313 and 323, HDD-I/Fs 314 and 324, and intercontroller I/Fs 315 and 325) in the controllers 310 and 320, respectively.

The intercontroller I/Fs 315 and 325 in the controllers 310 and 320 are connected to each other through a bus 330 represented by a serial bus suitable for transfer of data with a small data transfer size. The intercontroller I/Fs 316 and 326 are connected to each other through the asynchronous transfer bus 340 suitable for transfer of data having a large data transfer size.

Note that a conventional disk array apparatus has neither the intercontroller I/Fs 316 and 326 nor the bus 340 for connecting the intercontroller I/Fs 316 and 326 to each other.

For this reason, conventionally, data transfer between the controllers 310 and 320 must be performed through the internal buses 317 and 327 under the control of the MPUs 311 and 321.

Figure 3:
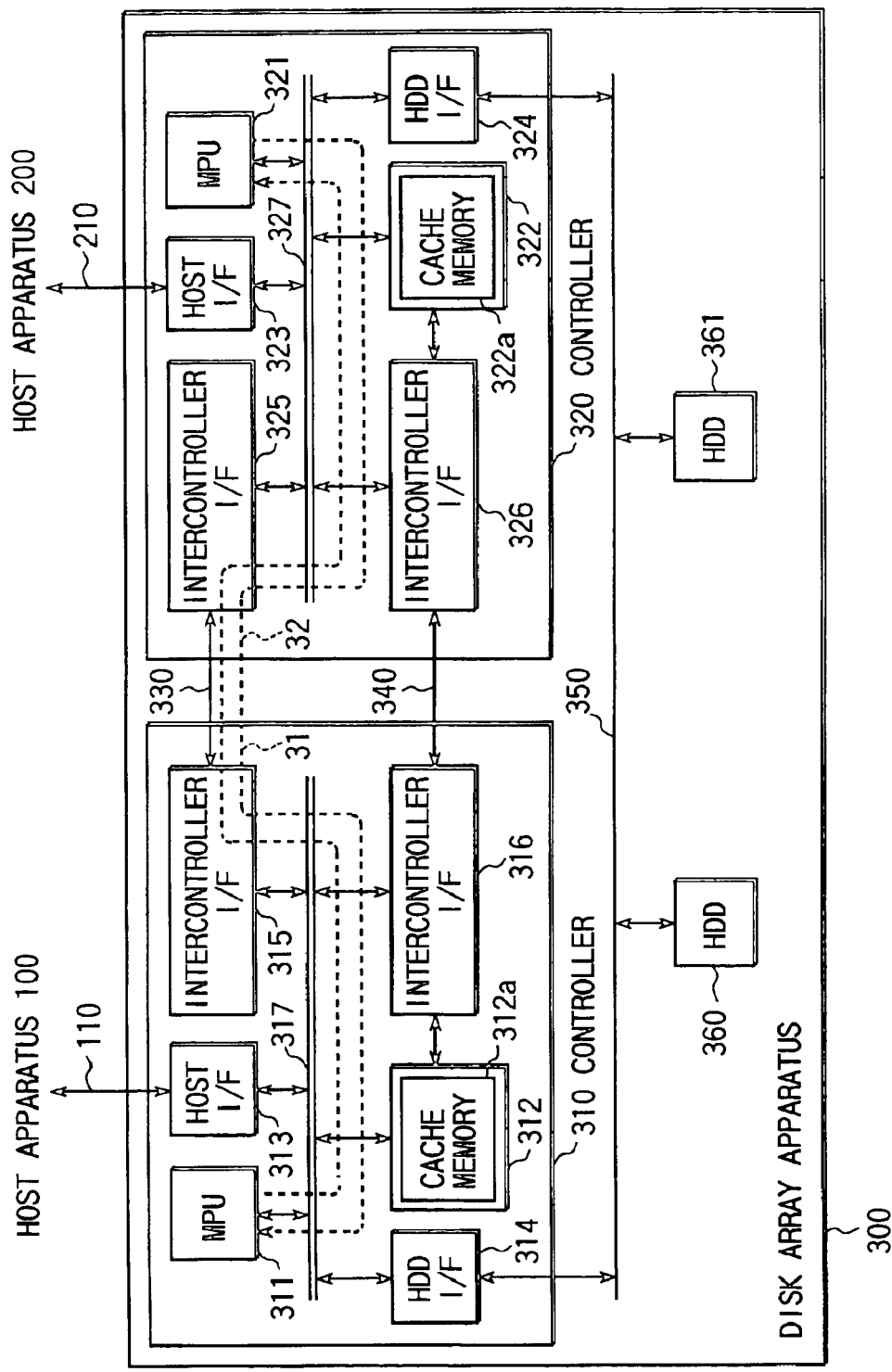
FIG. 3 is a block diagram for explaining communication paths used for intercontroller communication in the embodiment.

The operation of the disk array apparatus 300 having the arrangement shown in FIG. 1 and applied to the system shown in FIG. 2 will be described next with reference to FIGS. 3 and 4 by exemplifying a case wherein in a data write requested for the controller 310, the copy data is stored in the cache memory section 322 in the other controller 320.

Assume that a data write request is sent from the host apparatus 100 to the controller 310 in the disk array apparatus 300 through the bus 110.

When the controller 310 receives the write request from the host apparatus 100 through the host I/F 313, write data transfer from the host apparatus 100 to the controller 310 begins.

The data transferred from the host apparatus 100 through the bus 110 is received by the host I/F 313 in the controller 310, passes through a path: host I/F 313→internal bus 317→cache memory section 312, and is stored in the cache memory 312a incorporated in the cache memory section 312 of the controller 310.

In this embodiment, in case of a (write) cache hit wherein the data in the disk array (HDD in the disk array), which is designated by the write request from the host apparatus 100, is also present in the cache memory 312a, the corresponding data in the cache memory 312a is updated to the write data from the host apparatus 100.

The write data stored in the cache memory 312a is a target for delay write in the disk array (HDD in the disk array) designated by the write request from the host apparatus 100.

To copy (mirror) the same write data as that stored in the cache memory section 312 of the controller 310 (self system) in the cache memory section 322 of the controller 320 (counterpart system), the MPU 311 in the controller 310 checks if the controller 320 is not stopped, by intercontroller communication (control data exchange) using the intercontroller I/F 315 through the internal bus 317.

More specifically, the MPU 311 sends an inquiry to the MPU 321 in the controller 320 through a path 31: MPU 311→internal bus 317→intercontroller I/F 315→bus 330→intercontroller I/F 325→internal bus 327→MPU 321, as shown in FIG. 3.

The MPU 321 in the controller 320 receives the inquiry from the MPU 311 in the controller 310 (from the intercontroller I/F 325 through the internal bus 327) and returns a response representing that the controller 320 is normal to the MPU 311 in the controller 310 through a path reverse to that for the inquiry, i.e., a path 32: MPU 321→internal bus 327→intercontroller I/F 325→bus 330→intercontroller I/F 315→internal bus 317→MPU 311, as shown in FIG. 3.

Upon receiving the normal response from the MPU 321 in the controller 320, the MPU 311 instructs the cache memory section 312 to copy the previously stored data to the cache memory section 322, using a path 41: MPU 311→internal bus 317→cache memory section 312, as shown in FIG. 4.

Figure 4:
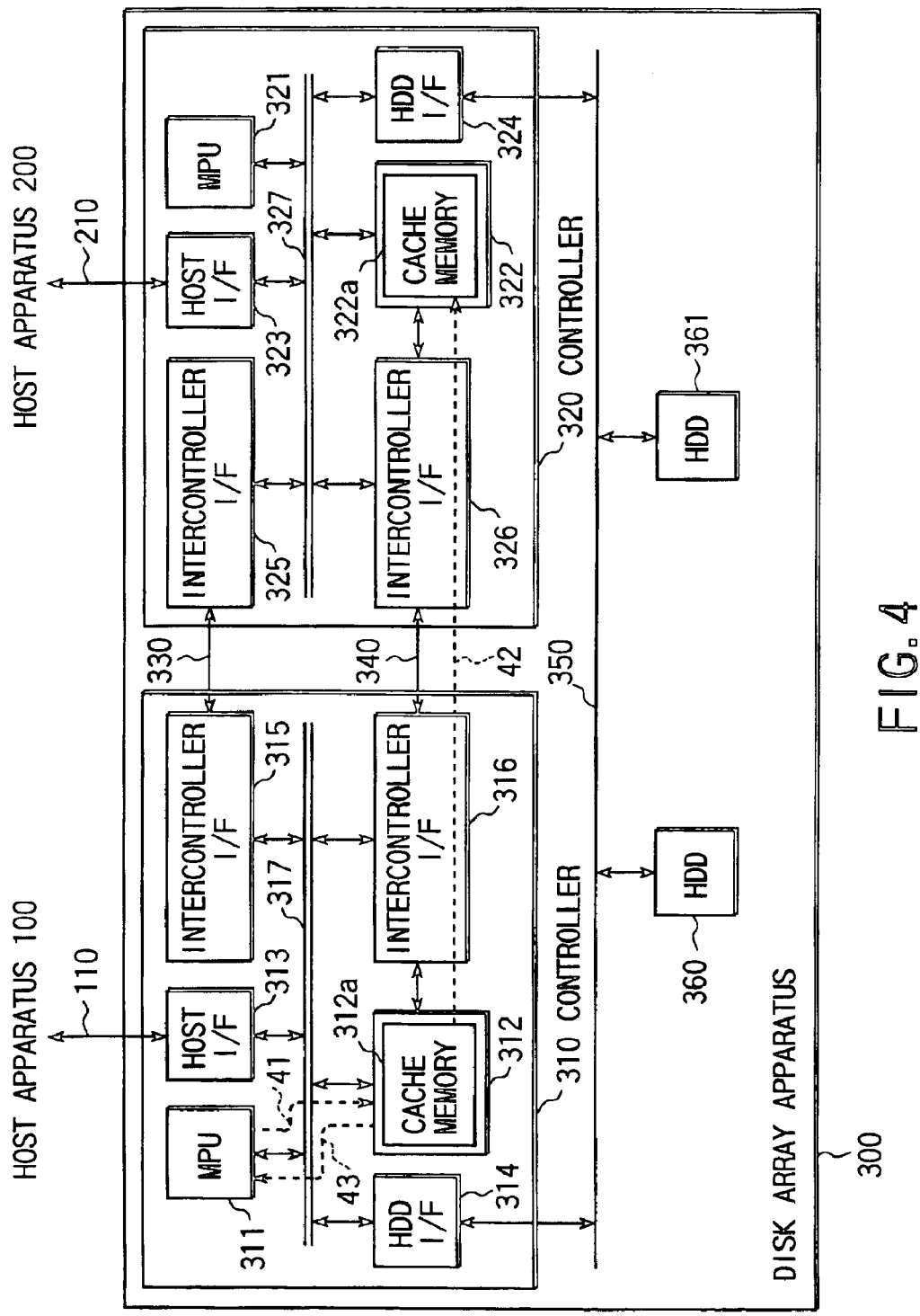
FIG. 4 is a block diagram for explaining communication paths used for data copy in the embodiment.

The cache memory section 312 copies the designated data to the cache memory 322a (copy area ensured in the cache memory 322a) in the controller 320 by data transfer using the intercontroller I/F 316 through a path 42: cache memory 312a→intercontroller I/F 316→bus 340→intercontroller I/F 326→cache memory 322a, as shown in FIG. 4.

In this data transfer, finally, a transfer status representing the data transfer result is returned from the intercontroller data transfer I/F (port) of the cache memory section 322 (in the controller 320) to the intercontroller data transfer I/F (port) of the cache memory section 312 (in the controller 310) through a path reverse to the path 42.

When it is determined on the basis of the transfers status that the data transfer is ended, the cache memory section 312 notifies the MPU 311 that the transfer (copy) to the cache memory 322a is ended, through the connection I/F (port) to the internal bus 317 using a path 43: cache memory section 312→internal bus 317→MPU 311, as shown in FIG. 4.

Upon receiving the completion notification of transfer (copy) to the cache memory 322a and confirming that the copy (mirror) from the cache memory 312a to the cache memory 322a is ended, the MPU 311 determines that the data write requested by the host apparatus 100 is ended, and returns a write completion notification to the host apparatus 100 through a path: MPU 311→internal bus 317→host I/F 313→bus 110→host apparatus 100.

Since the completion notification of copy (mirror) from the cache memory 312a to the cache memory 322a has a small transfer size, it may be sent to the MPU 311 in the controller 310 using the path 32.

As described above, in this embodiment, for the inquiry and its response between the controllers 310 and 320 (MPUs 311 and 321 in the controllers 310 and 320), i.e., for intercontroller communication (control data exchange), the path 31 (32) including the intercontroller I/Fs 315 and 325 and bus 330 is used. For data transfer (copy) between the cache memories 312a and 322a, the path 42 including the inter-controller I/Fs 316 and 326 and bus 340 is used.

In other words, when the transfer size is smaller than a predetermined size, the path 31 (32) including the intercontroller I/Fs 315 and 325 and bus 330 is used. When the transfer size is larger than a predetermined size, the path 42 including the intercontroller I/Fs 316 and 326 and bus 340 is used. The transfer data amount of intercontroller communication is much smaller than that of data transfer (data copy) between the cache memories 312a and 322a in which a large quantity of data is transferred.

When the bus 330 as the main part of the path 31 is formed from a serial bus, as in this embodiment, the time required for (control data exchange in) the procedure until the start of data transfer and that after the end of data transfer is short, unlike the asynchronous transfer bus 340. That is, the overhead in the transfer procedure is small.

On the other hand, the larger the data amount is, the longer the data transfer time becomes, and vice versa. Hence, the bus 330 is expected to do high-speed response for data transfer with a small data amount, as in the above intercontroller communication.

Conventionally, however, (since neither the intercontroller I/Fs 316 and 326 nor the bus 340 are present), the path 31 (32) (including the inter-controller I/Fs 315 and 325 and bus 330) is used for data transfer (data copy) between cache memories, for which the data transfer amount is large, as well as for intercontroller communication with a small data transfer amount.

This path 31 (32) includes the internal buses 317 and 327 in the controllers 310 and 320. Since use of the internal buses 317 and 327 for data copy increases the bus traffic, and additionally, processing by the MPUs 311 and 321 is necessary, the copy performance and the processing performance for requests from the host apparatuses 100 and 200 may degrade.

To the contrary, in this embodiment, the intercontroller I/Fs 316 and 326 connected to the cache memory sections 312 and 322 are provided, and data transfer operations (for data copy) between the cache memories 312a and 322a in the cache memory sections 312 and 322 are independently performed by the inter-controller I/Fs 316 and 326 from the MPUs 311 and 321 through the path 41 mainly including the bus 340 (independently of the internal buses 317 and 327).

The above-described degradation in performance can be reduced because the internal buses 317 and 327 connected to various modules in the controllers 310 and 320 are not used for data copy, and processing by the MPUs 311 and 321 are unnecessary.

When the bus 340 is formed from a synchronous transfer bus, as in this embodiment, the procedure until the start of data transfer and that after the end of data transfer are complex, and the overhead in the transfer procedure is large, unlike the bus 330.

On the other hand, the time required for data transfer such as data copy through the bus 330 within a predetermined transfer size is shorter than the time required for the procedure.

Hence, within a predetermined transfer size, data transfer via the bus 340 using the intercontroller I/Fs 316 and 326 has a predetermined response almost determined by the time required for the data transfer procedure, independently of the transfer size.

In the above arrangement in which the path 31 (32) including the internal buses 317 and 327, inter-controller I/Fs 315 and 325, and bus 330 is not used for data copy, i.e., the path 31 (32) is used for only data transfer such as intercontroller communication with a small data amount, the signal bit width of the bus 330 can be reduced (hardware can be downsized), and instead, a high-speed signal line can be used at limited cost. For this reason, intercontroller communication can be processed at a high speed.

In the disk array apparatus 300 having the arrangement shown in FIG. 2, a failure may occur in any one of the intercontroller I/F 315, bus 330, inter-controller I/F 325 as main components of the path 31 (32) or the intercontroller I/F 316, bus 340, and intercontroller I/F 326 as main components of the path (42).

In this embodiment, the path including the HDD-IF 314, bus 350, and HDD-IF 324 can be used as an alternative path in case of a failure in any one of the elements on the paths.

To implement the path (alternative path) including the HDD-IF 314, bus 350, and HDD-IF 324, when a failure occurs in an element on the paths, for example, the controller 310 changes designation of a device used for communication on the internal bus 317 from the intercontroller I/F 315 or the intercontroller data transfer I/F (port) of the cache memory section 312 to the HDD-IF 314, or the controller 320 changes designation of a device used for communication on the internal bus 327 from the intercontroller I/F 325 or the intercontroller data transfer I/F (port) of the cache memory section 322 to the HDD-IF 324, as shown in FIG. 6 (S1 and S2).

Figure 5:
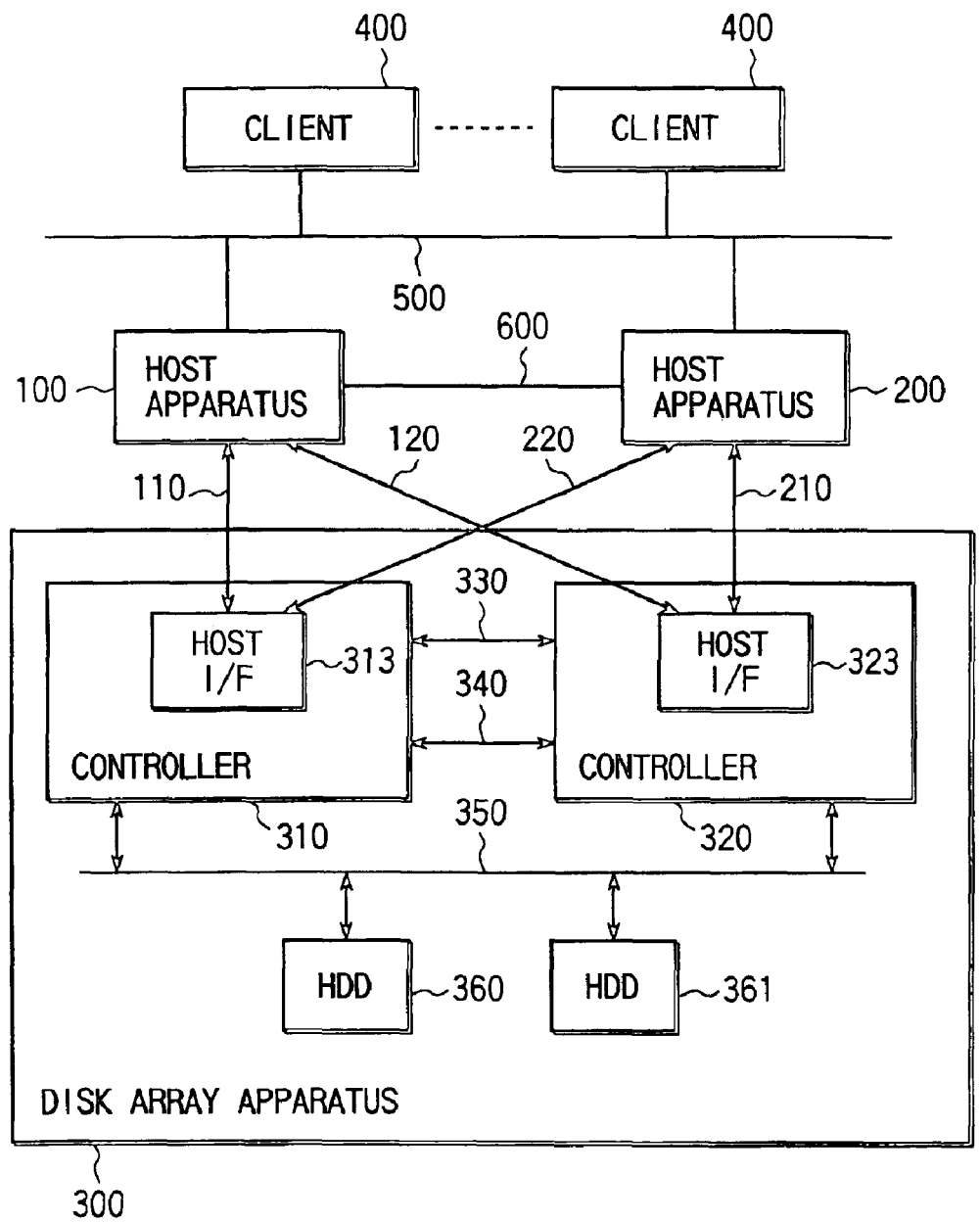
FIG. 5 is a block diagram showing a modification to the system shown in FIG. 2.

Preferably, each of the host I/Fs 313 and 323 of the controllers 310 and 320 has two ports connected to the host apparatuses, and the host apparatuses 100 and 200 are connected to the host I/Fs 323 and 313 in the controllers 320 and 310 through: buses 120 and 220 corresponding to the buses 110 and 210, respectively, as shown in FIG. 5.

In this arrangement, as shown in FIG. 7, when a failure occurs in the controller 310 itself or on the communication path 110 between the host apparatus 100 and the controller 310, the host apparatus 100 can selectively use the controller 320 of the counterpart system by using the bus 120 (S11 and S12).

Similarly, as shown in FIG. 8, when a failure occurs in the controller 320 itself or on the communication path between the host apparatus 200 and the controller 320, the host apparatus 200 can selectively use the controller 310 of the counterpart system by using the bus 220 (S21 and S22).

In the arrangement shown in FIG. 5, each of the host apparatuses 100 and 200 performs alternative processing for the counterpart apparatus when a failure occurs in the counterpart apparatus. For this purpose, the host apparatuses 100 and 200 mutually monitor a failure.

This monitoring may be done through the network 500. However, in consideration of traffic and reliability, the monitoring is preferably done through a bus 600 such as an Ethernet bus for connecting the host apparatuses 100 and 200, as shown in FIG. 5. The host apparatuses 100 and 200 may perform processing for each other, or one of the host apparatuses may be a standby system.

A case has been described above, in which the present invention is applied to a disk array apparatus incorporating a duplex controller, which selectively uses two types of communication paths in accordance with the size of information for information communication between the controllers constructing a duplex controller (the information communication type reflecting the difference in information size, i.e., whether the information communication is inter-controller communication included in predetermined procedures before and after data transfer or data transfer itself), thereby increasing the speed of information communication. However, the present invention is not limited to this.

The present invention can also be applied to increase the speed of information communication in an information communication system having apparatuses of two systems for mutual information communication.

As has been described above in detail, according to the present invention, the communication paths used for information communication between the two systems, represented by information communication between controllers constructing a duplex controller, are selectively used depending on the difference in transfer size (difference in information communication type reflecting the difference in transfer size) in the information communication between the systems. This enables high-speed information communication between the systems.

Especially, in a system for information communication between controllers (of a duplex controller) each incorporating a cache memory using the mirrored cache scheme, high-speed data copy between the controllers can be realized.

In addition, according to the present invention, in a system having at least one disk apparatus commonly accessible from the first and second systems and a communication path for connecting the systems to each other, this communication path is used as an alternative path in case of a failure in the communication paths selectively used for information communication between the systems. Hence, the path can be made redundant without preparing a special redundant path.

The present invention is not limited to the above embodiments, and various changes and modifications can be made without departing from the spirit and scope of the present invention. In addition, the embodiments can be appropriately combined as much as possible. In this case, a combined effect can be obtained. Furthermore, the embodiments include inventions of various phases, so various inventions can be extracted by appropriately combining a plurality of disclosed components. For example, when an invention is extracted by omitting several components from the all components disclosed in the embodiments, and the extracted invention is to be practiced, the omitted parts are appropriately compensated for by known technologies.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information communication system for performing information communication between a first system and a second system, comprising:
   a first communication path that is used for information communication when a transfer size between the first system and the second system is smaller than a predetermined size and is capable of high-speed response when the transfer size is smaller than the predetermined size; and
   a second communication path that is used for information communication when the transfer size between the first system and the second system is larger than the predetermined size and has a larger transfer capability than that of said first communication path when the transfer size is larger than the predetermined size;
   wherein each of the first and second systems comprises main control means for selectively using one of said first and second communication paths in accordance with a size of information subjected to information communication with a counterpart system;
   an internal bus connected to said main control means;
   first interface control means for sequentially performing information communication with the counterpart system through said first communication path under the control of said main control means in its system through said internal bus; and
   second interface control means for performing information communication with the counterpart system through said second communication path independently of said main control means in accordance with an instruction from said main control means in its system, wherein the information communication by the second interface control means is performed without using the internal bus.

2. A system according to claim 1, further comprising:
   at least one disk apparatus commonly accessible from the first and second systems; and
   a third communication path for connecting the first and second systems to said at least one disk apparatus, wherein
   when a failure occurs on a first path including said first communication path and said first interface control means or a second path including said second communication path and said second interface control means, said main control means uses said third communication path as an alternative path of the first or second path.

3. A system according to claim 1, wherein
   the first and second systems comprise a duplex controller whose controllers each incorporate a cache memory using a mirrored cache scheme, and
   said second interface control means causes a second interface control means in the counterpart system to copy data stored in the cache memory in its system to a cache memory in the counterpart system through said second communication path in accordance with an instruction from said main control means in its system.

4. An information communication system comprising:
   a first communication path used for communication between a first system and a second system; and
   a second communication path used for communication between the first system and the second system;
   wherein each of the first and second systems comprises means for determining one of said first communication path and said second communication path, through which data is to be transferred, on the basis of a type of data to be exchanged between the first system and the second system;
   an internal bus connected to main control means;
   first interface control means for sequentially performing information communication with a counterpart system through said first communication path under the control of said main control means in its system through said internal bus; and
   second interface control means for performing information communication with the counterpart system through said second communication path independently of said main control means in accordance with an instruction from said main control means in its system, wherein the information communication by the second interface control means is performed without using the internal bus.

5. A system according to claim 4, wherein each of the first and second systems comprises a controller for controlling a hard disk drive.

6. A system according to claim 5, wherein
   each of the first and second system comprises a cache memory for storing data transferred from a host apparatus,
   a control signal necessary for transmitting data stored in the cache memory is transmitted to said first communication path, and
   the data stored in the cache memory is transmitted to said second communication path.

7. A system according to claim 4, further comprising:
   at least one disk apparatus commonly accessible from the first and second systems; and
   a third communication path for connecting the first and second systems to said at least one disk apparatus, wherein
   when a failure occurs on a first path including said first communication path and said first interface control means or a second path including said second communication path and said second interface control means, said main control means uses said third communication path as an alternative path of the first or second path.

8. A system according to claim 4, wherein the first and second systems comprise a duplex controller whose controllers each incorporate a cache memory using a mirrored cache scheme, and said second interface control means causes a second interface control means in the counterpart system to copy data stored in the cache memory in its system to a cache memory in the counterpart system through said second communication path in accordance with an instruction from said main control means in its system.

\* \* \* \* \*